United States Patent
Crinon et al.

(10) Patent No.: US 7,380,028 B2
(45) Date of Patent: May 27, 2008

(54) ROBUST DELIVERY OF VIDEO DATA

(75) Inventors: Regis J. Crinon, Camas, WA (US); Edwin Arturo Heredia, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 234 days.

(21) Appl. No.: 10/697,502

(22) Filed: Oct. 30, 2003

(65) Prior Publication Data

US 2004/0255063 A1  Dec. 16, 2004

Related U.S. Application Data

(60) Provisional application No. 60/478,731, filed on Jun. 13, 2003.

(51) Int. Cl.
- G06F 3/00 (2006.01)
- G06F 13/00 (2006.01)
- H04B 15/00 (2006.01)

(52) U.S. Cl. .................. 710/52; 455/501; 455/68; 455/70

(58) Field of Classification Search .............. 455/501, 455/63.01, 68, 70; 710/52
See application file for complete search history.

(56) References Cited

U.S. PATENT DOCUMENTS

| | | | |
|---|---|---|---|
| 4,706,260 A | 11/1987 | Fedele et al. |
| 4,954,892 A | 9/1990 | Asai et al. |
| 5,235,618 A | 8/1993 | Sakai et al. |
| 5,291,486 A | 3/1994 | Koyanagi |
| 5,541,852 A | 7/1996 | Eyuboglu et al. |
| 5,606,539 A | 2/1997 | De Haan et al. |
| 5,608,697 A | 3/1997 | De Haan et al. |
| 5,844,867 A | 12/1998 | De Haan et al. |
| 5,933,451 A | 8/1999 | Ozkan et al. |
| 5,952,943 A | 9/1999 | Walsh et al. |
| 5,970,173 A | 10/1999 | Lee et al. |
| 6,060,997 A | 5/2000 | Taubenheim et al. |
| 6,233,226 B1 | 5/2001 | Gringeri et al. |
| 6,408,096 B2 | 6/2002 | Tan |
| 6,459,811 B1 | 10/2002 | Hurst, Jr. |
| 6,728,317 B1 | 4/2004 | Demos |

(Continued)

FOREIGN PATENT DOCUMENTS

EP  0852445 A2  8/1998

OTHER PUBLICATIONS

ISO/IEC 13818-1, "MPEG-2 Systems—Coding of Moving Pictures and Associated Audio," 129 pp. (Mar. 1994).

(Continued)

Primary Examiner—Kim Huynh
Assistant Examiner—Scott Sun
(74) Attorney, Agent, or Firm—Klarquist Sparkman, LLP (57) ABSTRACT

The systems and methods described herein relate to the robust delivery of data. A transmitter (e.g. a server or RF broadcaster) passes parameters to a receiver and/or client enabling operation of a generalized buffer model within the receiver that regulates the proper decoding of the elementary stream. An exemplary transmitter system is configured to perform a method for specifying buffer control parameters and transmitting them within an MPEG-2 Transport Stream to a receiver. The receiver is configured to implement the generalized buffer model according to the parameters received within the stream.

35 Claims, 9 Drawing Sheets

U.S. PATENT DOCUMENTS

| | | | |
|---|---|---|---|
| 6,775,840 B1* | 8/2004 | Naegel et al. ............... | 725/111 |
| 6,873,629 B2 | 3/2005 | Morris | |
| 2002/0012394 A1 | 1/2002 | Hatano et al. | |
| 2002/0061073 A1* | 5/2002 | Huang et al. ............... | 375/295 |
| 2002/0191712 A1* | 12/2002 | Gaddam et al. ............ | 375/301 |
| 2003/0053416 A1* | 3/2003 | Ribas-Corbera et al. .... | 370/233 |
| 2004/0142698 A1* | 7/2004 | Jollota et al. ............ | 455/452.2 |
| 2004/0255063 A1 | 12/2004 | Crinon et al. | |

OTHER PUBLICATIONS

Cliff Reader, "History of MPEG Video Compression—Ver. 4.0," 99 pp., document marked Dec. 16, 2003.

Printouts of FTP directories from http://ftp3.itu.ch , 8 pp. (downloaded from the World Wide Web on Sep. 20, 2005.).

Chen et al., "Source Model for Transform Video Coder and Its Application—Part II: Variable Frame Rate Coding," *IEEE Transactions on Circuits and Systems for Video Technology*, 7(2); 13 pp. (Apr. 1997).

Hsu, Chi-Yuan et al., "Joint Selection of Source and Channel Rate for VBR Video Transmission Under ATM Policing Constraints" *IEEE Journal on Selected Areas in Communications*, 15(6); 13 pp. (Aug. 1997).

Reibman, et al., "Constraints on Variable Bit-Rate Video for ATM Networks," *IEEE Transactions on Circuits and Systems for Video Technology*, 2(4); 12 pp. (Dec. 1992).

Ribas-Corbera et al., "A Generalized Hypothetical Reference Decoder for H.264/AVC," *IEEE Transactions on Circuits and Systems for Video Technology*, 13(7); 14 pp. (Jul. 2003).

ISO/IEC JVT-G050r1 (Draft ITU-T Rec. H.264), "Joint Video Specification," 268 pp. (May 2003).

ISO/IEC 14496-2, "Coding of Audio-Visual Objects: Visual," 330 pp. (Mar. 1998).

ISO/IEC 11172-2, "Coding of Moving Pictures and Associated Audio for Digital Storage Media at Up to About 1,5 Mbit/s, Part 2: Video," 122 pp. (Aug. 1993).

ISO/IEC JVT-D131, "HRD and Related Issues," 5 pp. (Jul. 2002).

ISO/IEC JVT-D157, "Joint Video Specification," 206 pp. (Jul. 2002).

ISO/IEC JVT-E133, "Time—Shift Causality Constraint on the CAT-LB HRD," 8 pp. (Oct. 2002).

ITU-Telecommunications Standardization Sector, VCEG-N58, "A Generalized Hypothetical Reference Decoder for H.26L," 14 pp. (Sep. 2001).

ITU-T Recommendation H.261, "Line Transmission of Non-Telephone Signals," International Telecommunication Union, 28 pp. (Mar. 1993).

ITU-T Recommendation H.262, "Transmission of Non-Telephone Signals," International Telecommunciation Union, 211 pp. (Jul. 1995).

ITU-T Recommendation H.263, "Series H: Audiovisual and Multimedia Systems, Infrastructure of Audiovisual Services—Coding of Moving Video," International Telecommunication Union, 167 pp. (Feb. 1998).

U.S. Appl. No. 60/488,710, filed Jul. 18, 2003, Srinivasan et al.

U.S. Appl. No. 60/501,081, filed Sep. 7, 2003, Srinivasan et al.

U.S. Appl. No. 60/501,133, filed Sep. 7, 2003, Holcomb et al.

Annex-C, "Video Buffering Verifier," Information Technology-Generic Coding of Moving Pictures and Associated Audio Information: Video, *International Telecommunications Union*, H.262, pp. 137-142 (Feb. 2000).

Microsoft Corporation, "Microsoft Debuts New Windows Media Player 9 Series, Redefining Digital Media on the PC," 4 pp. (Sep. 4, 2002) [Downloaded from the World Wide Web on Jul. 16, 2004].

Mook, "Next-Gen Windows Media Player Leaks to the Web," *BetaNews*, 18 pp. (Jul. 19, 2002) [Downloaded from the World Wide Web on Mar. 16, 2004].

Ribas-Corbera et al., A Generalized Hypothetical Reference Decoder for H.26L (proposal) ITU Study Group 16 Question 6 (Q.6/SG16), VCEG, VCEG-N58, 14th Meeting, Santa Barbara, CA, Sep. 2001.

Sheu et al., "A Buffer Allocation Mechanism for VBR Video Playback," Communication Tech. Proc. 2000, WCC-ICCT 2000, vol. 2, pp. 1641-1644 (2000).

Sullivan et al., "The H.264/AVC Advanced Video Coding Standard: Overview and Introduction to the Fidelity Range Extensions," 21 pp. (Aug 2004).

Walpole et al., "A Player for Adaptive MPEG Video Streaming over the Internet," Proc. SPIE, vol. 3240, pp. 270-281 (1998).

Pao et al., "Encoding Stored Video for Streaming Applications," *IEEE Transactions on Circuits and Systems for Video Technology*, vol. 11, No. 2, pp. 199-209 (Feb. 2001).

Reed et al., "Constrained Bit-Rate Control for Very Low Bit-Rate Streaming-Video Applications," *IEEE Transactions on Circuits and Systems for Video Technology*, vol. 11, No. 7, pp. 882-889 (Jul. 2001).

\* cited by examiner

ROBUST DELIVERY OF VIDEO DATA

RELATED APPLICATIONS

This application claims the benefit of U.S. Provisional Application No. 60/478,731, filed Jun. 13, 2003, entitled "Robust Delivery of Video Data", which is hereby incorporated by reference.

TECHNICAL FIELD

The systems and methods described herein relate to the robust delivery of data, including the passage of parameters governing buffer operation from a transmitter (e.g. a broadcaster's head-end facility or server) to a receiver or client, and the operation of a buffer within the receiver in the course of decoding data from a video elementary stream.

BACKGROUND

Traditional approaches to multimedia streaming provide content that is encoded at a constant or variable bit rate and transmitted from a server to one or more clients over a transmission channel with finite and fixed capacity. For example, standard telephone quality audio content is often encoded at 64 K bits per second (b/s). Therefore, a telephone transmission channel must have a throughput of at least 64 K b/s to properly stream the audio content.

In newer developments, video content or other content (e.g. audio, data, etc.) may be delivered over the communication channel using an adjustable transmission bit rate, wherein the adjustable transmission bit rate may be balanced with robustness. One reason for concern over robustness is that some forms of data transmission—such as over-the-airwaves RF broadcast—may require levels of data protection against transmission errors that are to a degree a function of the current weather conditions and/or geographic topology of the area wherein the signal is broadcast and received. For example, a thunder storm may induce higher levels of interference. Thus, a server or transmitter may select an appropriate degree of data protection to provider a higher degree of robustness in the transmission. A higher degree of data protection is typically achieved by increasing the power of channel coding techniques (such techniques increase the level of redundancy in the data) which leads to a reduced bit rate for the transmission of information (video, audio or data).

Accordingly, an over-the-airwaves RF transmitter may select a more robust mode of data transmission under circumstances that threaten the overall quality of service planned by the service provider or transmitter. For example, where bad weather reduces the effective information data transmission rate, it may be necessary to use a greater amount of the available bandwidth to provide redundancy. Such redundancy may include the use of a cyclical redundancy code (CRC) or convolutional block codes within the transmission. Accordingly, the bandwidth remaining for content transmission may be reduced, possibly resulting in lower video content display resolution.

Unfortunately, where the available information bandwidth changes and the transmitter changes the amount of the bandwidth devoted to redundancy, known receivers may fail to buffer and process the incoming data in an efficient manner.

SUMMARY

The systems and methods described herein relate to robust delivery of data. A transmitter (e.g. a broadcaster head-end facility and/or a server) passes parameters to a receiver and/or client enabling operation of a generalized buffer model within the receiver. The generalized buffer model is designed in accordance with the adjustable transmission rates allowed by a robust delivery system. An exemplary transmitter is configured for generation and specification of buffer control parameters and for transmission of the parameters within an MPEG-2 Transport Stream to a receiver. The receiver is configured to implement the generalized buffer model according to the parameters received within the stream.

BRIEF DESCRIPTION OF THE DRAWINGS

The same numbers are used throughout the drawings to reference like features and components.

DETAILED DESCRIPTION

The systems and methods described herein relate to the robust delivery of data, from a transmitter (e.g. a broadcaster head-end facility or server) to a receiver or client. The data may include mixed audio and video data such as that included within conventional or high-definition (HDTV) digital television representations. Data, delivery of which is governed by the operations of a well defined reference buffer model, is included within a data stream sent to the receiver. For example, the transmitter may be configured to specify buffer control parameters, which indicate the data transmission rate, the buffer size and the initial buffer fullness values prior to data removal, for use by the receiver. The parameters may be included within an MPEG-2 Transport Stream as part of a data structure (e.g., a table) transmitted at frequent intervals. The receiver may be configured to obtain the parameters from the Transport Stream and to configure its acquisition operations according to the reference buffer model specified by the aforementioned parameters.

Figure 1:
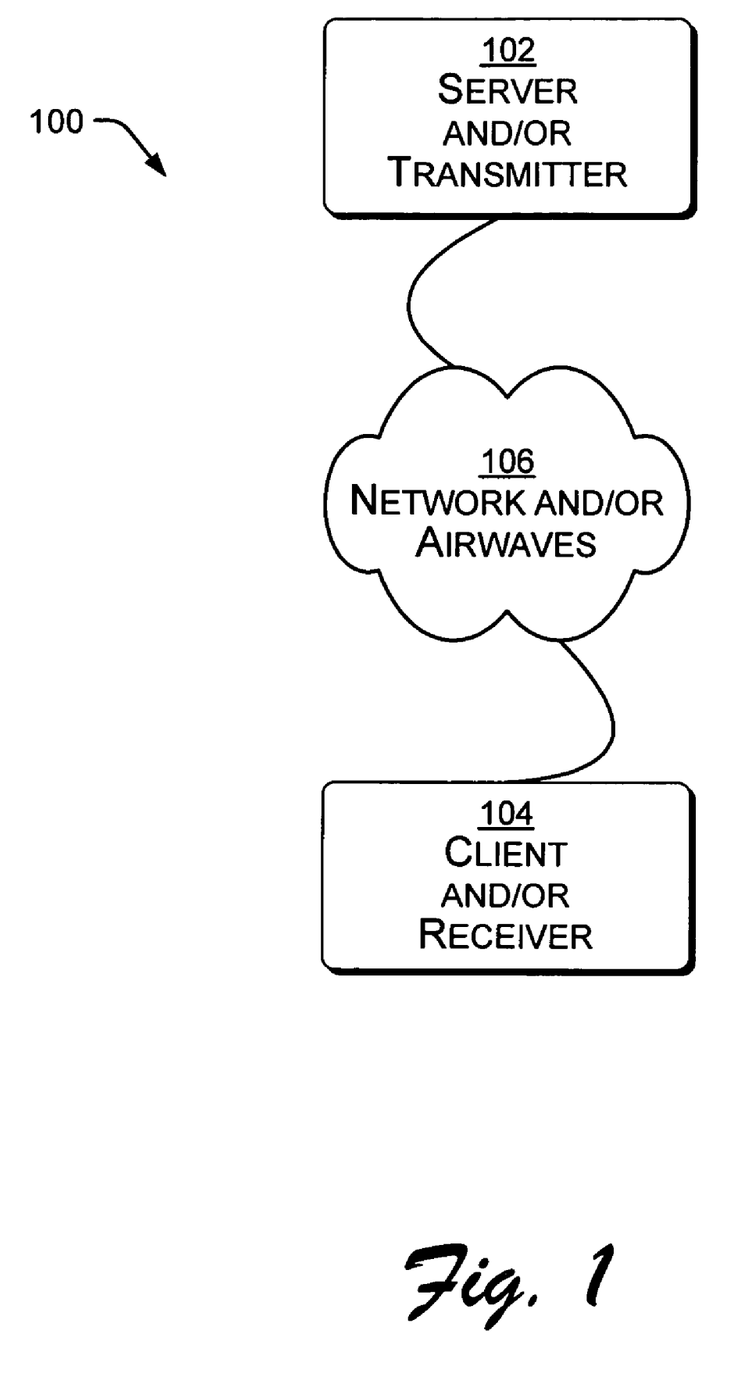
FIG. 1 is a block diagram of an exemplary server/transmitter and an exemplary client/receiver in accordance with the systems and methods described herein.

FIG. 1 is a block diagram of an exemplary environment 100, within which a server or transmitter 102 may transmit data to a client or receiver 104 across a network or the broadcast airwaves 106. The transmitter 102 may transmit using an RF signal over the airwaves 106 to the receiver 104. For example, a digital television station may transmit to a television receiver, possibly having a set-top box for decoding the digital signal. The digital TV station may broadcast standard resolution or high-definition television signals. Alternatively, the server 102 may send streaming data over the Internet 106 to a client 104.

Figure 2:
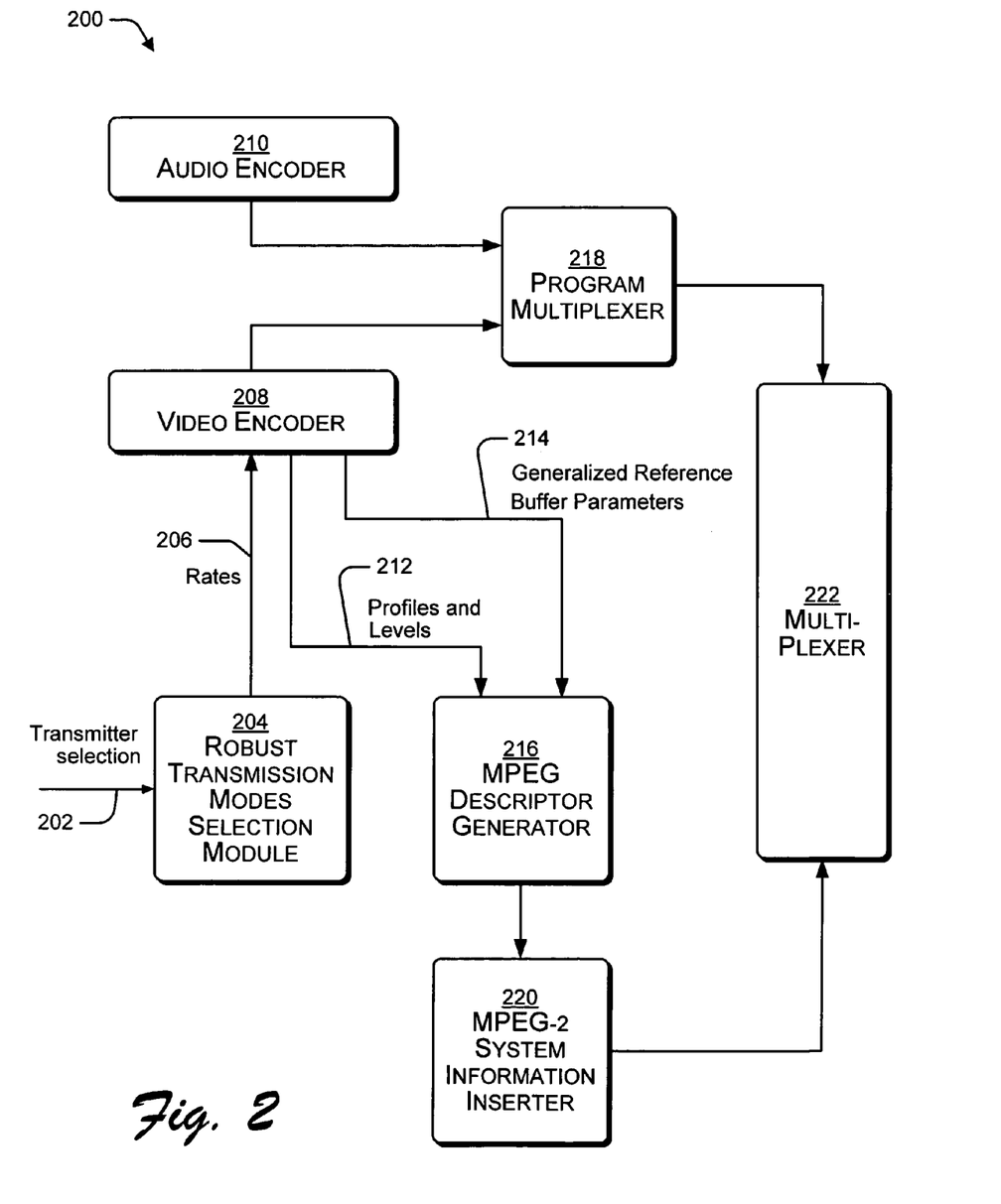
FIG. 2 is a block diagram illustrating additional detail within the exemplary server or transmitter.

FIG. 2 is a block diagram illustrating a portion 200 of an exemplary server or transmitter 102 (FIG. 1). A signal 202 indicates a transmitter selection of a level of robustness at which to transmit data. As will be further discussed with reference to FIGS. 4-6, the desired robustness, and the associated rate of information transmission, can be related to environmental or geographical factors where an over-the-air (radio frequency) means of transmission is employed. The transmitter therefore evaluates the conditions (e.g. weather, sun spots, hills, canyons, service type, etc.) and decides how robust the data transmission must be to deliver service of a targeted quality level. Other factors such as transmission power and characteristics of antennas may influence the transmitter's selection as well. This information is transmitted by the signal 202 to a robust transmission modes selection device or procedure 204, which can be implemented in hardware, firmware or software. At the robust transmission modes selection device or procedure 204, information 206 on rates of data transmission corresponding to the degree of robustness desired are selected for transmission to the video encoder 208. Video and audio encoders 208, 210 can be configured for operation using a Windows Media Video encoder or any other video encoder including MPEG-2, MPEG-4, H.264 encoders, or any desired technology. The video encoder 208 provides profile and level data 212 and generalized reference buffer parameter data 214 to the MPEG descriptor generator 216. The video encoder 208 compresses the video or audio elementary stream at a nominal data rate (typically one of the rates supplied in 206) and sends the compressed data to the program multiplexer 218.

The descriptor generator 216 is configured to generate a descriptor according to a syntax convention, such as the profile and level sub-descriptor syntax seen in Table 1, below. An exemplary description generator 216 may be configured for MPEG compatibility; however, the description generator 216 could be made compatible with an alternative transmission protocol or a different location in the bit stream. Notwithstanding the exemplary descriptor shown, the format and information contained within the descriptor, as well as the location of this information in the transmitted bit-stream, can be varied according to the requirements of a particular application. An exemplary syntax for use in forming the descriptor produced by the descriptor generator 216 is seen in Table 1, below.

TABLE 1

Syntax for the Profile and Level sub-descriptor

| Syntax | Bits | Format |
| --- | --- | --- |
| sd_profile_level() { | | |
|   subdescriptor_tag | 8 | 0x01 |
|   profile_level | 8 | uimsbf |
|   bm_params_count | 8 | uimsbf |
|   for(i=0; i<bm_params_count; i++){ | | |

TABLE 1-continued

Syntax for the Profile and Level sub-descriptor

| Syntax | Bits | Format |
| --- | --- | --- |
|     reserved | 2 | '11' |
|     bit_rate_value | 22 | uimsbf |
|     reserved | 2 | '11' |
|     vbv_buffer_size | 22 | uimsbf |
|   } | | |
| } | | |

The data structure seen in Table 1 is exemplary, and alternative terminology, variable names, bit-lengths and formats could be employed to result in similar functionality. An exemplary implementation of the profile_level field seen in Table 1, can be further described by Table 2, below.

TABLE 2

List of values for the profile_level field

| Assigned Value | Description |
| --- | --- |
| 0x00 | Reserved |
| 0x11 | Simple Profile, Low Level |
| 0x12 | Simple Profile, Medium Level |
| 0x13-0x50 | Reserved |
| 0x51 | Main Profile, Low Level |
| 0x52 | Main Profile, Medium Level |
| 0x53 | Main Profile, High Level |
| 0x54-0xFF | Reserved |

Figure 6:
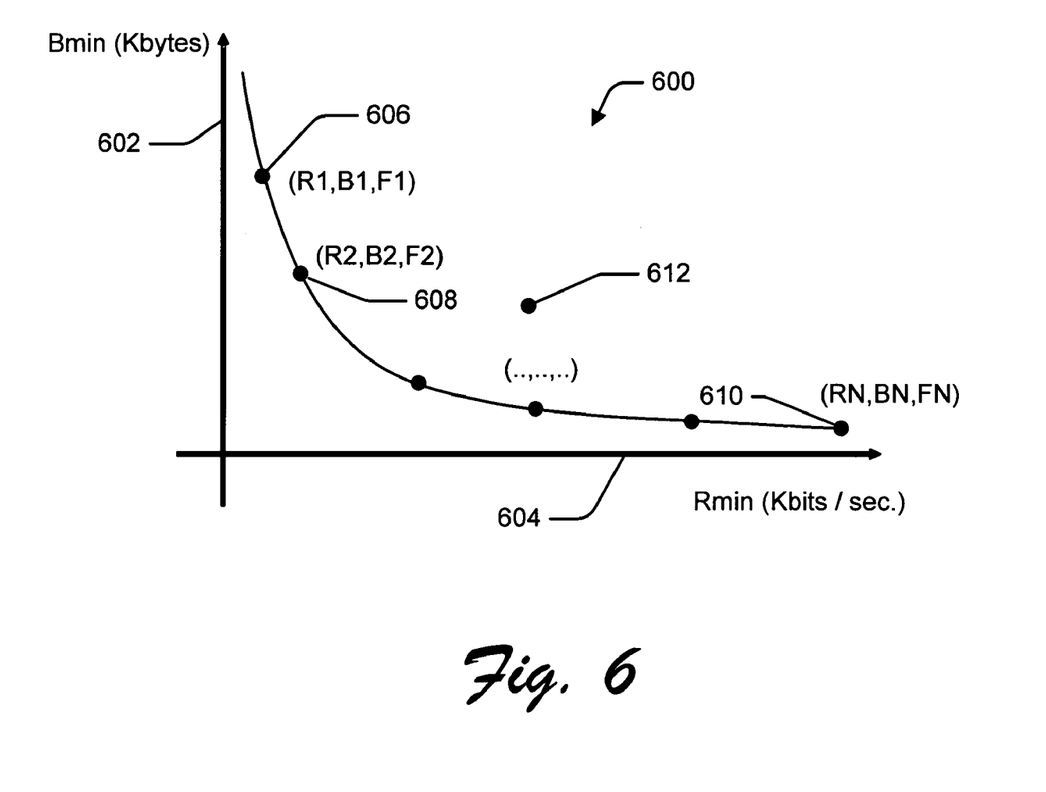
FIG. 6 is a graph showing an exemplary relationship between the data transfer rate and the minimal buffer size for selected values of buffer fullness, thereby illustrating exemplary points which may be used to configure a buffer.

The descriptor generator 216 delivers a data structure similar to that described by Tables 1 and 2 to the system information inserter 220, which may be based on MPEG-2 technology. The descriptor may be designed to convey multiple sets of (R, B, F) (rate, buffer size, fullness) tuplets. (An example of multiple sets of (R, B, F)-tuplets is seen in FIG. 6, and is discussed below.) An exemplary system information inserter 220 may feed the descriptor information generated by descriptor generator 216 into a multiplexer 222 at regular intervals, such as, for example, every 0.4 seconds.

Additionally, the output of the audio encoder 210 and the video encoder 208 are multiplexed by a program multiplexer 218 and sent to multiplexer 222 to be multiplexed with the descriptor information from the inserter 220. The output of the multiplexer 222 may be an MPEG-2 Transport Stream comprising packets of audio, video elementary streams as well as packets containing information such as the descriptor defined in Table 1. The resulting MPEG-2 Transport Stream (or any alternate link-layer protocol) may then be encoded, converted to an analog signal, modulated and finally transmitted via an antenna to a receiver in a conventional manner, such as by RF transmission.

As seen above, FIG. 2 may interpreted in a manner which characterizes the transmitter as employing RF (radio frequency broadcast) tools to service a metropolitan area, or as employing the Internet to provide global service. However, the transmitter may also be configured on a much smaller scale, such as a home network. In this configuration, the transmitter is an Access Point of a home wireless network. The transmitter's head end may be configured utilizing a home PC, and the receivers (indicated at 104 in FIG. 1) may include TV receivers and other portable or fixed devices. Accordingly, the scale of the transmitter, client and network may be refined according to the needs of a particular design requirement.

Figure 3:
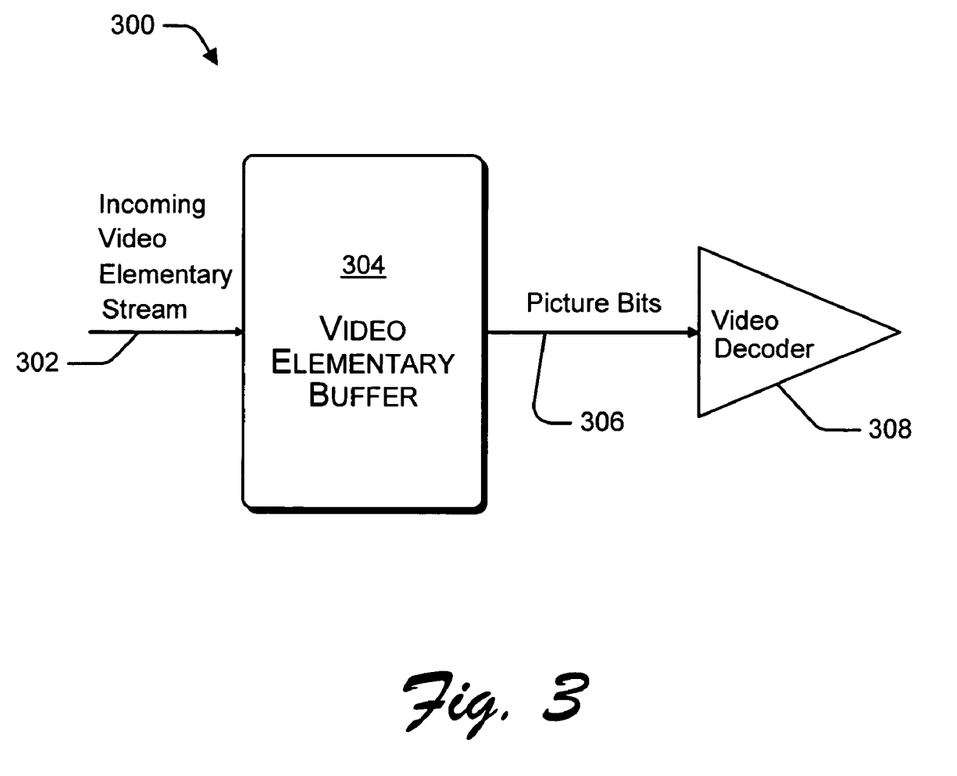
FIG. 3 is a block diagram illustrating additional detail within the exemplary client or receiver.

FIG. 3 is a block diagram illustrating a portion 300 of an exemplary client or receiver 104 (FIG. 1). The client 104 is configured to receive data from the server/transmitter 102 and to detect descriptor within transmitted data. The client is configured to decide which conventional and robust channels within the transmitted data (see FIGS. 5, 6 and associated discussion) to select to reliably receive audio, video and data elementary streams by monitoring reception characteristics and statistics. The client is further configured to determine a data transmission rate and to identify a corresponding set of buffer parameters from the descriptor. Using the selected transmission channel(s), the receiver configures memory resources and flow control logic to provide elementary stream acquisition according to guidelines embodied by buffer parameters associated with the selected transmission channel. As in-coming data fills a buffer, the data is decoded when the buffer contains a quantity of data equal or greater than the specified initial buffer fullness value.

Continuing to refer to FIG. 3, an incoming video elementary stream 302 is received by the video elementary buffer 304. The video elementary buffer 304 is typically configured automatically by hardware, upon receipt of the descriptor generated by the descriptor generator 216 (FIG. 2). As seen above, the descriptor may be re-transmitted at frequent intervals, such as more than twice a second. This allows any receiver to quickly receive the descriptor data and configure the video elementary buffer 304 upon powering on. Similarly, upon receiving a descriptor having new or updated data, the receiver is able to reconfigure its buffer operation based on the new data, which may include the data transmission rate, the minimum buffer size and the initial buffer fullness required before data is removed from the buffer. The descriptor itself, or the information it carries could also be obtained as part of a request-response protocol over a bi-directional channel, or it could be obtained from a separate out-of-band broadcast channel. In particular, the video elementary buffer 304 is configured, according to the descriptor's information, to a suggested reference size; to receive data at an in-coming rate; and to remove data and start decoding the first picture in the elementary stream when the buffer has reached a certain degree of fullness.

Data removed from the buffer 304, such as picture bits 306, are decoded by a video decoder 308 for use by other portions of the receiver 104 (FIG. 1).

The receiver 104 is capable of detecting the effective bit rate (and therefore the degree of robustness used in the robust channel) by monitoring the symbol rate on the main channel and the symbol rate on the robust channel. Symbol rate may be estimated after the demodulation and channel decoding stage in the receiver. The receiver is also capable of monitoring the quality of the transmitted signal via the calculation of several quantities including signal-to-noise ratio, carrier-to-noise ratio, average energy or signal strength of the TV signal (the 6 Mhz band to which the receiver is tuned), peak energy or signal strength of the TV signal, number of corrupted MPEG-2 packets in a given time window, run-length of corrupted MPEG-2 packets, or residual energy in the equalizing filter. Such quantities may be used by the receiver to make an instantaneous selection of either the main portion of the channel or the robust portion of the channel depending on the value of some of these quantities. The selection may be done seamlessly or under the control of a timing mechanism ensuring that usage of either portion of the transmission channel lasts for a nominal time window. The receiver uses the main (conventional robustness) portion of the channel to get video, audio and data elementary streams when acquisition conditions are acceptable. Switching to acquisition of video, audio and data elementary streams from the robust portion of the channel is performed when quantities calculated to monitor the quality of the signal indicate that conditions have deteriorated. When switching occurs, the receiver uses the reference buffer parameters transmitted in the descriptor of Table 1 (or any other similar table) to adjust its acquisition buffer according to the information rate observed in the newly selected portion of the transmission channel. Switching to using the robust portion of the transmission channel may result in a lower quality of service for the video, audio or data since the robust channel typically brings a reduced bandwidth compared to the main channel. Alternatively, switching from the main (conventional) portion of the transmission channel to the robust portion of the channel may trigger the change of the video, audio and data decoder used to decode and render the audio-visual information. For example, a conventional MPEG-2 decoder may be associated with the main portion of the channel and the decoder for a more efficient coding scheme like Windows Media 9 or H.264 may be associated with the robust portion of the transmission channel. In this case, use of a more efficient coding scheme with the robust mode allows a transmitter to match quality of service (similar perceived quality in the rendered video, audio, data) across the conventional and robust portions of the 6 Mhz transmission channel. Adjustment of the buffer operations by the receiver is desirable to optimize the delay that may follow from the sub-channel switching operation. Optimal selection of the buffer parameters may also allow a receiver to use memory resources for other purposes.

Figure 4:
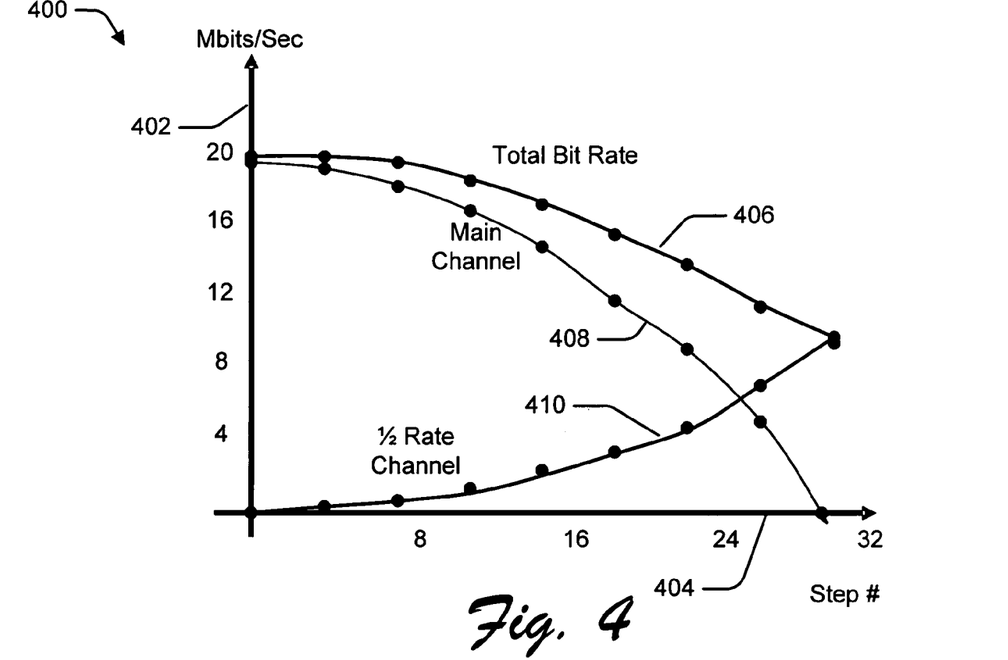
FIG. 4 is a graph showing an exemplary relationship between redundancy and bit rate (bandwidth).

FIG. 4 is a graph 400 showing the relationship between redundancy and bit rate (bandwidth). Such a relationship can result from selections made by the robust transmission modes selection module or device 204, wherein one of a plurality of discrete levels of robust data transmission may be selected according to a perception of the data redundancy required. The effective rate of information data transmission is seen on the vertical axis 402, and discrete steps indicating increasing use of a robust ½ rate channel coding mode is seen on the horizontal axis 404. The total bit rate (i.e. bandwidth) 406 is seen to fall off with increasing degree of robustness. The figure illustrates the case where only a portion 410 of a communication channel is targeted for increased robustness while the other portion of the same communication channel remains subject to a typical level of robustness. This situation is consistent with the new, enhanced, 8-VSB modulation mode that the Advanced Television System Committee (ATSC) is currently entertaining, which will allow transmitters to dedicate a portion of a 6 MHz communication channel to provide greater robustness against data corruption. It can be noticed that the fall off behavior occurs both in the main portion 408 of the transmission channel subject to conventional channel coding (robustness) and the portion 410 of the communication channel selected for more powerful channel coding (increased robustness).

Figure 5:
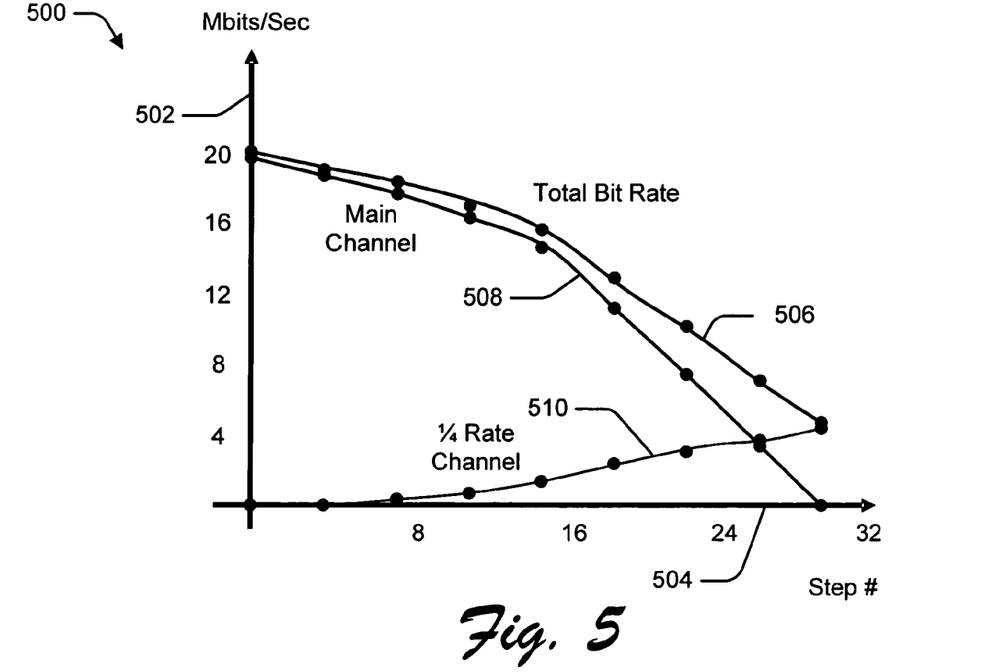
FIG. 5 is a graph that is similar to that of FIG. 4, but which shows even further accentuation of the decrease in bandwidth corresponding to an increase in use of a redundant channel.

FIG. 5 is a graph 500 that is similar to that of FIG. 3, but which shows even further accentuation of the decrease in bandwidth corresponding to a further increase in use of data redundancy in the portion 510 of the transmission channel. As seen in FIG. 2, such an increase (or decrease) may result from operation of the robust transmission modes selection device or procedure 204 (FIG. 2). The rate of data transmission is seen on the vertical axis 502, and discrete steps indicating increasing use of a robust ¼ rate channel coding mode is seen on the horizontal axis 504. The total bit rate (i.e. bandwidth) 506 is seen to fall off to a greater degree than seen in FIG. 4 with increasing use of the robust channel 510. Accordingly, the main channel 508 includes less bandwidth than it would where a less robust second channel was used.

FIG. 6 is a graph 600 showing an exemplary relationship between the data transfer rate along the horizontal axis 604 and the minimal size of the reference elementary stream buffer (e.g. buffer 304 of FIG. 3) along the vertical axis 602. Selected values 606-610 are plotted along the curve, at which a buffer 304 (FIG. 3) may be configured. The exemplary points 606-610 each include three values, (R, B, F), which comprise values for rate of data transfer, buffer size and buffer fullness, i.e. how full the buffer must be before data at the very beginning of the elementary stream may start being withdrawn. The (R, B, F) values may be used to configure the video elementary buffer 304 (FIG. 3) of the client 104 (FIG. 1).

By inspection of the graph 600, it can be seen that slower data rates result in the need for a larger buffer. In an extreme case of slow transmission rate, most of a TV show would have to be buffered prior to viewing to prevent buffer underflow. In contrast, high data transmission rates result in the need for a smaller buffer. The value for F (buffer fullness required before data withdrawal) is set to indicate the minimal amount of data to cache in the buffer before a receiver begins to remove data and decode the first picture. The value for F prevents under-flow conditions (i.e. a condition wherein there is not enough data available in the buffer to continue normal decoding operations) and overflow situations (i.e. a situation wherein data has been lost for lack of buffer space) in the buffer. Note that the region to the upper right of the curve includes locations 612 which represent workable buffer parameters, while the region to the lower left of the curve includes locations which represent unworkable buffer parameters.

Figure 7:
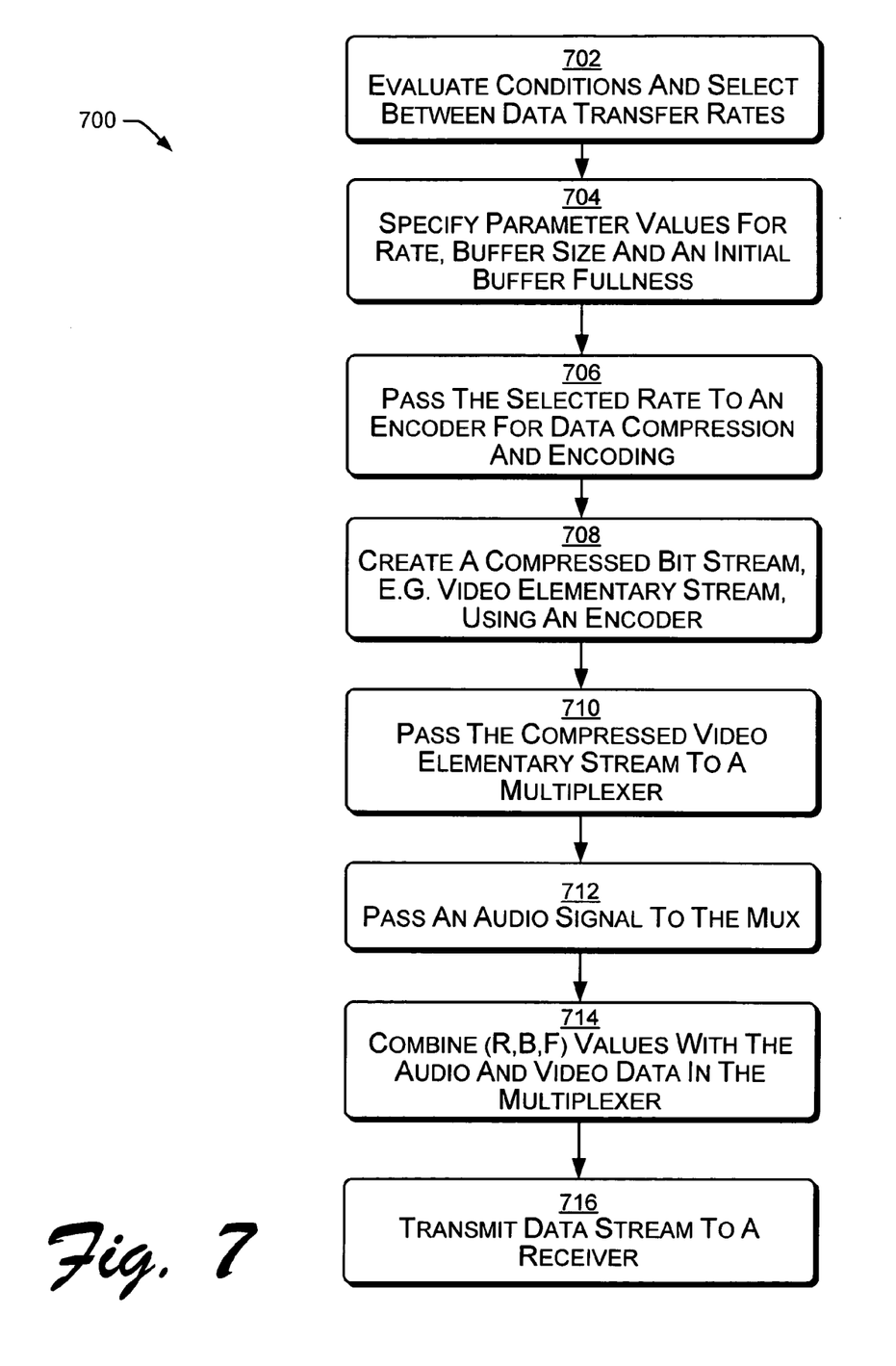
FIG. 7 is a flow diagram of an exemplary method of operation of a transmitter or server.

The flow chart of FIG. 7 illustrates a further exemplary implementation, wherein a method 700 is employed to operate a server or transmitter 102 (FIG. 1). At block 702, conditions requiring redundancy are identified or detected, such as bad weather conditions which may interfere with a broadcast DTV (digital TV) or HDTV (high-definition TV) transmission. For example, the conditions (weather, etc.) may be inserted at 202 (FIG. 2) into the robust transmission modes selection module 204.

At block 704, an algorithm, graph or a table is used to generate the parameter values for data transfer rate, minimally required buffer size and initial buffer fullness corresponding to the possible conditions established in 702, e.g. the values (R, B, F). While the configuration of an (R, B, F) data structure is flexible, a descriptor data structure representing the (R, B, F) parameters may be based on the example of Tables 1 and 2, or similar configuration. In the exemplary environment of FIG. 2, these values may be generated by the MPEG-2 descriptor generator 216, and reflect a family of information data transmission rates (i.e. the bandwidth) from which the transmitter may select in the future. For example, FIG. 6 illustrates an exemplary family of information data transmission rates, minimal buffer sizes and values for initial buffer fullness before data is withdrawn from the buffer. Such data points may be determined through experimentation or calculation. A selected data transfer rate can be used to determine a minimally sufficient buffer size. Also, the selected data transfer rate and minimally sufficient buffer size may be used to select the initial buffer fullness required before allowing data to be removed from the buffer.

At block 706, the rate, buffer and fullness (R, B, F) values are transmitted to one or more data encoders, such as encoders 208, 210 configured to encode video and audio data, respectively. Transmission of the F parameter is optional as it is only meaningful for the acquisition of the beginning of an elementary stream which is typically not the case since viewers typically tune in at other random points in the elementary streams. At block 708, a compressed bit stream, such as an audio or video elementary stream, is created using the encoders.

At blocks 710-714, the video elementary stream, audio elementary stream and (R, B, F) parameters are passed to a multiplexer (e.g. multiplexer 222 of FIG. 2), where all three (if all three are available) are combined. The parameters may then be packetized and multiplexed with audio and video data packets. In the example of FIG. 2, the MPEG-2 system information inserter 220 sends the packetized descriptor to the multiplexer 222, while the program multiplexer 218 sends the audio and video data to the multiplexer 222.

At block 716, the multiplexed data is then transmitted to the receiver. The transmission may be by radio (RF signal), the Internet, or over any other network having any technology or topology.

Figure 8:
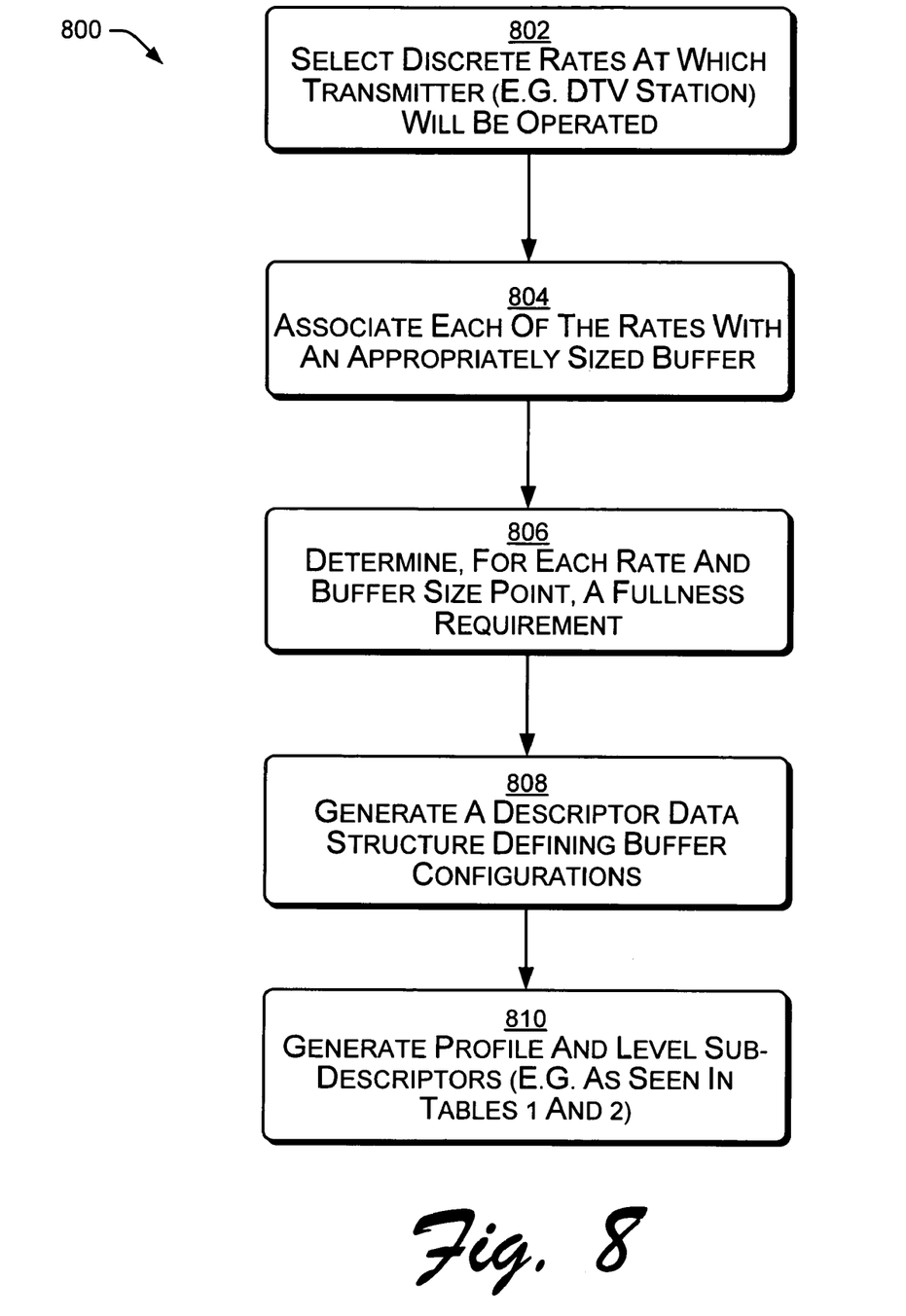
FIG. 8 is a flow diagram of an exemplary method by which buffer parameters may be set.

The flow chart of FIG. 8 illustrates a further exemplary implementation, wherein a method 800 is employed by which buffer parameters, such as the (R, B, F) values of FIG. 6, may be set. At block 802, the transmitter selects discrete rates of data transfer at which the DTV station will be operated. The selected rates may provide the transmitter with a variety of data transfer rates, including faster and slower data transfer rates, for use with better and worse weather conditions, respectively. In the exemplary portion 200 of the transmitter 102 of FIG. 1, the robust transmission modes selection device or procedure 204 could be used to select the data rates. At block 804, each of the selected rates is associated with an appropriately sized buffer. For example, the graph of FIG. 6 could be employed to associate larger buffers with slower data transfer rates, and smaller buffers with faster data transfer rates. At block 806, for each rate and buffer size, an initial buffer fullness requirement is determined. The initial buffer fullness requirement is a quantity of data which must be met or exceeded before data may be removed from the buffer. Both the rate of data transfer and the size of the buffer impact the selection of the initial buffer fullness requirement. At block 808, a descriptor data structure is generated defining buffer configurations. At block 810, the descriptor data structure may be generated by an MPEG descriptor generator 216 (FIG. 2) or similar hardware, firmware or software structure. In one implementation, the descriptor may be configured to resemble the data structure disclosed by Tables 1 and 2.

Figure 9:
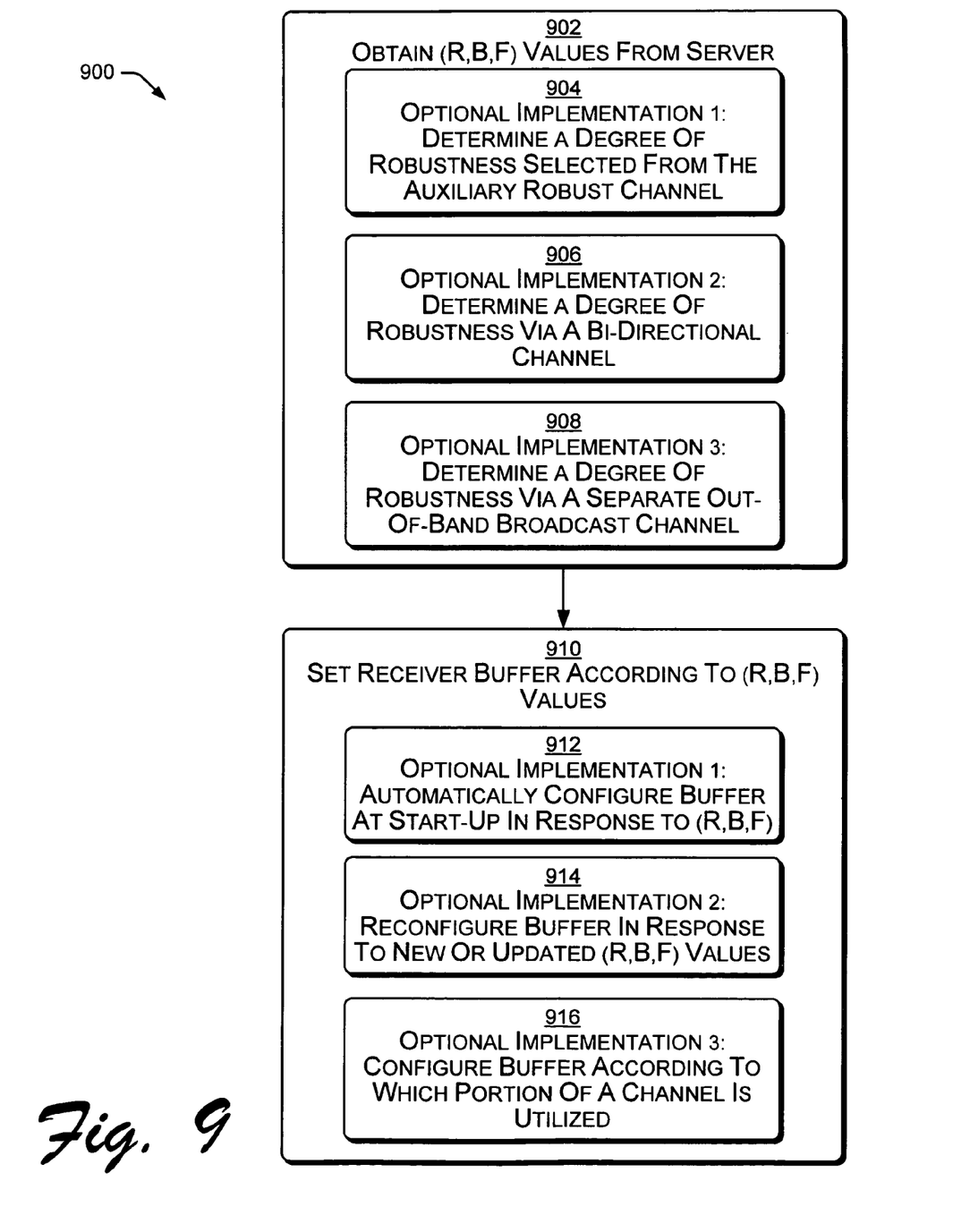
FIG. 9 is a flow diagram of an exemplary method of operation of a receiver or client.

The flow chart of FIG. 9 illustrates a further exemplary implementation, wherein a method 900 is employed by which a receiver or client may obtain and process data. At block 902, the receiver 104 determines a degree of robustness, typically selected by the transmitter 106, used in the auxiliary robust channel (e.g. 410, 510 of FIGS. 4 and 5, respectively). The receiver typically determines the degree of robustness from information (such as arrangement of symbols in a data frame) extracted from the lower transmission layers of the transmitted data. In a typical implementation, the (R, B, F) values are obtained from a data structure similar to that of Tables 1 and 2.

At block 904, in an optional implementation, the robustness value is applicable to an auxiliary robust channel, distinct from the main channel. For example, robust channels 410, 510 of FIGS. 4 and 5, respectively, may be configured to have a greater robustness than the main channels 406, 506.

At block 906, in a further optional implementation, the descriptor (e.g. the (R, B, F)-tuple or a data structure similar to Tables 1 and 2) could be obtained by communicating with the server 102 over a bi-directional channel as part of a request-response protocol.

At block 908, in a still further optional implementation, the client or receiver 104 can determine a degree of robustness via a separate out-of-band broadcast channel. This arrangement saves bandwidth within the robust channel, and may provide relatively rapid availability of the (R, B, F)-tuple and related information.

At block 910, the operation of the reference buffer 304 (FIG. 3) within the receiver is set according to the (R, B, F) values. In an exemplary configuration, a hardware circuit within the receiver 104 determines the degree of robustness in 410 or 510 selected by the transmitter and invokes the proper (R, B, F) parameter values among the set of parameter values transmitted in the descriptor to configure the buffer within memory resident in the receiver.

At block 912, in a first optional implementation, the receiver 104 automatically configures the buffer 304 (FIG. 3) at start-up in response to the (R, B, F) values. At block 914, in a second optional implementation, the receiver may automatically reconfigure the buffer 304 in response to new or updated (R, B, F) values. For example, changing environmental conditions may cause the transmitter 102 to reevaluate the level of robustness. Accordingly, the receiver 104 is configured to respond to changes in the (R, B, F)-tuple in response to new or changed information. At block 916, in a still further optional implementation, the buffer 304 is configured according to the degree to which a portion of the channel is robust. For example, were the receiver is receiving a robust portion of the channel 410, 510 (FIG. 4 and FIG. 5, respectively), the buffer would be configured differently than if a less robust portion 406, 506 of the channel was being received.

The elements of the methods shown may be performed by any desired means, such as by the execution of processor-readable instructions defined on a processor-readable media, such as a disk, a ROM or other memory device or by operation of an application specific integrated circuit (ASIC) or other hardware device. In one exemplary configuration, software/firmware may be used to implement the portions 200, 300 of FIGS. 2-3 according to an exemplary methods as seen in the flow charts of FIGS. 7-9. In a further exemplary configuration, a hardware device such as an ASIC may contain logic which implements portions 200, 300 according to an exemplary method as seen in the flow chart of FIGS. 7-9. Within the methods 700-900, actions described in any block may be performed in parallel with actions described in other blocks, may occur in an alternate order, or may be distributed in a manner which associates actions with more than one other block.

Exemplary Computer

Figure 10:
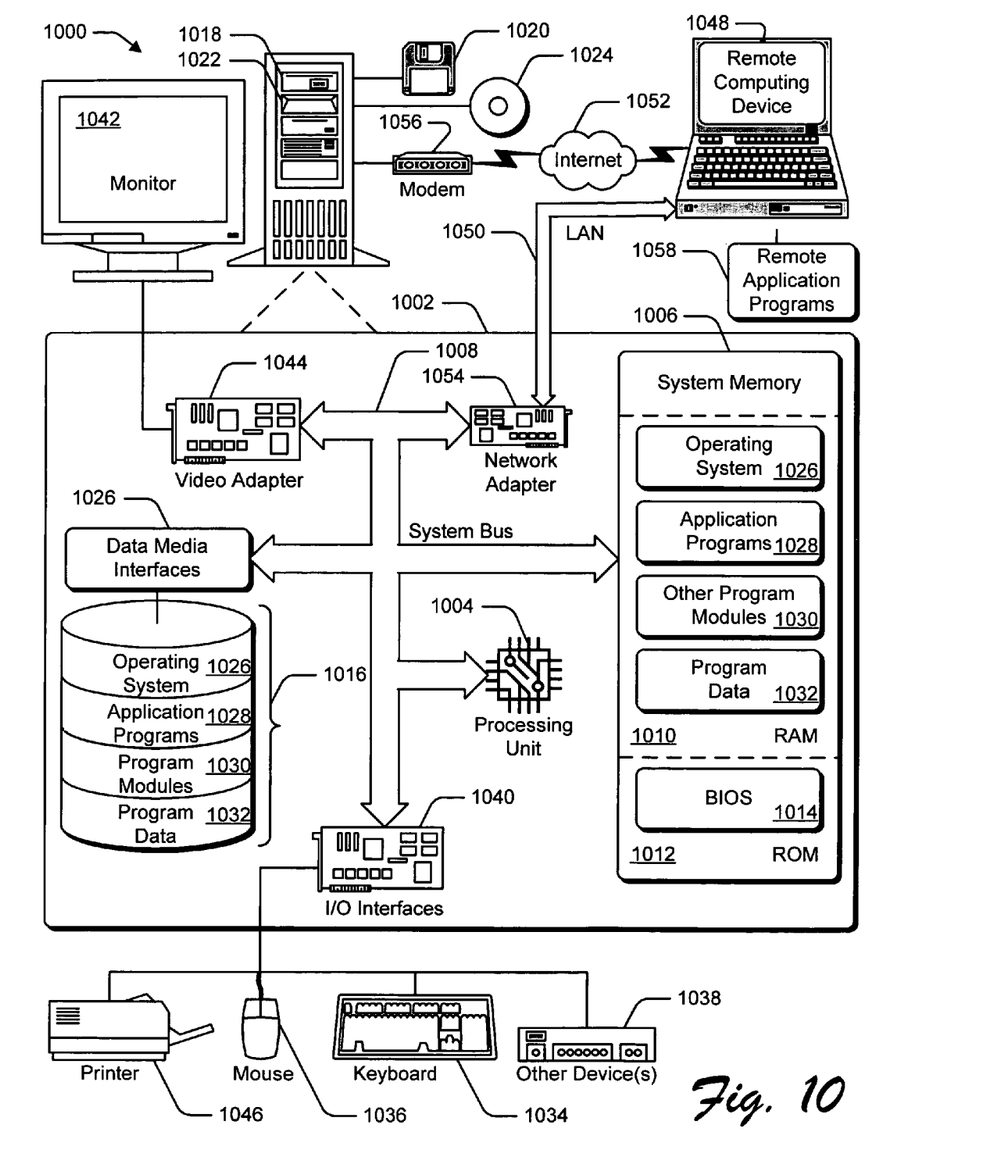
FIG. 10 is an example of a computing operating environment capable of implementing the server side and/or the client side of the systems and methods described herein.

FIG. 10 illustrates an exemplary computing environment suitable for implementing the server 102 or the client 104. Additionally, where a transmitter and receiver relationship is utilized, typically including an RF transmission from transmitter to receiver, the receiver may include a computing environment wherein in-coming data is processed. Although one specific configuration of computing environment is shown, similar configurations could be substituted.

The computing environment 1000 includes a general-purpose computing system in the form of a computer 1002. The components of computer 1002 can include, but are not limited to, one or more processors or processing units 1004, a system memory 1006, and a system bus 1008 that couples various system components including the processor 1004 to the system memory 1006.

The system bus 1008 represents one or more of any of several types of bus structures, including a memory bus or memory controller, a peripheral bus, an accelerated graphics port, and a processor or local bus using any of a variety of bus architectures. An example of a system bus 1008 would be a Peripheral Component Interconnects (PCI) bus, also known as a Mezzanine bus.

Computer 1002 typically includes a variety of computer readable media. Such media can be any available media that is accessible by computer 1002 and includes both volatile and non-volatile media, removable and non-removable media. The system memory 1006 includes computer readable media in the form of volatile memory, such as random access memory (RAM) 1010, and/or non-volatile memory, such as read only memory (ROM) 1012. A basic input/output system (BIOS) 1014, containing the basic routines that help to transfer information between elements within computer 1002, such as during start-up, is stored in ROM 1012. RAM 1010 typically contains data and/or program modules that are immediately accessible to and/or presently operated on by the processing unit 1004.

Computer 1002 can also include other removable/non-removable, volatile/non-volatile computer storage media. By way of example, FIG. 10 illustrates a hard disk drive 1016 for reading from and writing to a non-removable, non-volatile magnetic media (not shown), a magnetic disk drive 1018 for reading from and writing to a removable, non-volatile magnetic disk 1020 (e.g., a "floppy disk"), and an optical disk drive 1022 for reading from and/or writing to a removable, non-volatile optical disk 1024 such as a CD-ROM, DVD-ROM, or other optical media. The hard disk drive 1016, magnetic disk drive 1018, and optical disk drive 1022 are each connected to the system bus 1008 by one or more data media interfaces 1026. Alternatively, the hard disk drive 1016, magnetic disk drive 1018, and optical disk drive 1022 can be connected to the system bus 1008 by a SCSI interface (not shown).

The disk drives and their associated computer-readable media provide non-volatile storage of computer readable instructions, data structures, program modules, and other data for computer 1002. Although the example illustrates a hard disk 1016, a removable magnetic disk 1020, and a removable optical disk 1024, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1016, magnetic disk 1020, optical disk 1024, ROM 1012, and/or RAM 1010, including by way of example, an operating system 1026, one or more application programs 1028, other program modules 1030, and program data 1032. Each of such operating system 1026, one or more application programs 1028, other program modules 1030, and program data 1032 (or some combination thereof) may include an embodiment of a caching scheme for user network access information.

Computer 1002 can include a variety of computer/processor readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 1002 via input devices such as a keyboard 1034 and a pointing device 1036 (e.g., a "mouse"). Other input devices 1038 (not shown specifically) may include a microphone, joystick, game pad, satellite dish, serial port, scanner, and/or the like. These and other input devices are connected to the processing unit 1004 via input/output interfaces 1040 that are coupled to the system bus 1008, but may be connected by other interface and bus structures, such as a parallel port, game port, or a universal serial bus (USB).

A monitor 1042 or other type of display device can also be connected to the system bus 1008 via an interface, such as a video adapter 1044. In addition to the monitor 1042, other output peripheral devices can include components such as speakers (not shown) and a printer 1046 which can be connected to computer 1002 via the input/output interfaces 1040.

Computer 1002 can operate in a networked environment using logical connections to one or more remote computers, such as a remote computing device 1048. By way of example, the remote computing device 1048 can be a personal computer, portable computer, a server, a router, a network computer, a peer device or other common network node, and the like. The remote computing device 1048 is illustrated as a portable computer that can include many or all of the elements and features described herein relative to computer system 1002.

Logical connections between computer 1002 and the remote computer 1048 are depicted as a local area network (LAN) 1050 and a general wide area network (WAN) 1052. Such networking environments are commonplace in offices, enterprise-wide computer networks, intranets, and the Internet. When implemented in a LAN networking environment, the computer 1002 is connected to a local network 1050 via a network interface or adapter 1054. When implemented in a WAN networking environment, the computer 1002 typically includes a modem 1056 or other means for establishing communications over the wide network 1052. The modem 1056, which can be internal or external to computer 1002, can be connected to the system bus 1008 via the input/output interfaces 1040 or other appropriate mechanisms. It is to be appreciated that the illustrated network connections are exemplary and that other means of establishing communication link(s) between the computers 1002 and 1048 can be employed.

In a networked environment, such as that illustrated with computing environment 1000, program modules depicted relative to the computer 1002, or portions thereof, may be stored in a remote memory storage device. By way of example, remote application programs 1058 reside on a memory device of remote computer 1048. For purposes of illustration, application programs and other executable program components, such as the operating system, are illustrated herein as discrete blocks, although it is recognized that such programs and components reside at various times in different storage components of the computer system 1002, and are executed by the data processor(s) of the computer.

CONCLUSION

Although the subject matter has been described in language specific to structural features and/or methods, it is to be understood that the invention defined by the appended claims is not necessarily limited to the specific features or methods described herein. Rather, the specific features and methods are disclosed as exemplary forms of implementing the claimed systems and methods.

The invention claimed is:

1. In a receiver, a method comprising:
    detecting a descriptor within data transmitted by a transmitter, the descriptor including multiple sets of buffer parameters that specify multiple points on a rate-buffer size curve;
    selecting between conventional and robust channels, wherein relative to data of the conventional channel, data of the robust channel have a higher level of robustness to transmission errors due to an increase of redundancy in the data of the robust channel;
    based at least in part upon the level of robustness for the robust channel and effective rate of the data of the selected channel, identifying a buffer size using one or more of the multiple sets of buffer parameters, wherein for different levels of robustness the rate-buffer size curve provides different buffer sizes for the data of the selected channel;
    configuring memory resources and flow control logic to provide elementary stream acquisition according to guidelines embodied by the identified buffer size; and
    buffering the data of the selected channel until a buffer contains more than an initial buffer fullness value of the data of the selected channel.

2. The method of claim 1, further comprising reconfiguring the memory resources and the flow control logic upon receipt of a new descriptor.

3. A receiver having a buffer, memory resources, and flow control logic, said receiver comprising:
    means for detecting a descriptor within transmitted data, the descriptor including multiple sets of buffer parameters that specify multiple points on a rate-buffer size curve;
    means for deciding which of conventional and robust channels to select, wherein relative to data of the conventional channel, data of the robust channel have a higher level of robustness to transmission errors due to an increase of redundancy in the data of the robust channel;
    means for identifying a buffer size based at least in part upon the level of robustness for the robust channel, effective rate of the data of the selected channel, and one or more of the multiple sets of buffer parameters, wherein the rate-buffer size curve indicates different buffer sizes for different levels of robustness;
    means for configuring said memory resources and said flow control logic to provide elementary steam acquisition according to guidelines embodied by the identified buffer size; and means for decoding the data of the selected channel when said buffer contains greater than an initial buffer fullness value of the data of the selected channel.

4. The receiver of claim 3, wherein the means for configuring memory resources and flow control logic reconfigures the buffer upon receipt of a new descriptor.

5. The method of claim 1, further comprising monitoring reception characteristics and statistics for use in the selecting.

6. The method of claim 5, wherein the monitoring includes monitoring symbol rate for the conventional channel and symbol rate for the robust channel.

7. The method of claim 5, wherein the monitoring includes monitoring one or more of signal-to-noise ratio, carrier-to-noise ratio, average signal energy, and peak signal energy of the transmitted data, and wherein the transmitted data includes the data of the conventional channel and the data of the robust channel.

8. The method of claim 5, wherein the monitoring includes monitoring extent of packet corruption.

9. The method of claim 1, wherein the conventional channel is a first portion of a transmission channel and the robust channel is a second portion of the transmission channel.

10. The method of claim 9, wherein rate for the transmission channel exceeds rate for the conventional channel and exceeds rate for the robust channel.

11. The method of claim 1, wherein the relatively higher level of robustness of the data of the robust channel is in terms of increased redundancy through channel coding techniques for the data of the robust channel.

12. The method of claim 1, wherein the relatively higher level of robustness of the data of the robust channel is in terms of increased use of cyclical redundancy codes or convolutional codes within the data of the robust channel.

13. A computer-readable storage medium storing computer-executable instructions for causing the receiver programmed thereby to perform the method of claim 1.

14. The receiver of claim 3, wherein the means for deciding includes means for monitoring reception characteristics and statistics for use in the deciding.

15. The receiver of claim 14, wherein the monitoring includes monitoring symbol rate for the conventional channel and symbol rate for the robust channel.

16. The receiver of claim 14, wherein the monitoring includes monitoring one or more of signal-to-noise ratio, carrier-to-noise ratio, average signal energy, and peak signal energy of the transmitted data, and wherein the transmitted data includes the data of the conventional channel and the data of the robust channel.

17. The receiver of claim 14, wherein the monitoring includes monitoring extent of packet corruption.

18. The receiver of claim 3, wherein the conventional channel is a first portion of a transmission channel and the robust channel is a second portion of the transmission channel.

19. The receiver of claim 18, wherein rate for the transmission channel exceeds rate for the conventional channel and exceeds rate for the robust channel.

20. The receiver of claim 3, wherein the relatively higher level of robustness of the data of the robust channel is in terms of increased redundancy through channel coding techniques for the data of the robust channel.

21. The receiver of claim 3, wherein the relatively higher level of robustness of the data of the robust channel is in terms of increased use of cyclical redundancy codes or convolutional codes within the data of the robust channel.

22. In a receiver, a method comprising:

obtaining multiple sets of reference decoder parameters that specify multiple points on a rate-buffer size curve;

in the receiver, selecting between a conventional channel and a robust channel, wherein relative to data of the conventional channel, data of the robust channel have a higher level of robustness to transmissions errors due to an increase of redundancy in the data of the robust channel;

based at least in part upon the level of robustness for the robust channel and effective rate of the data of the selected channel, identifying a buffer size using one or more of the multiple sets of reference decoder parameters, the rate-buffer size curve providing different buffer sizes for different levels of robustness;

configuring a buffer in the receiver according to the identified buffer size; and in the buffer, buffering the data from the selected channel.

23. The method of claim 22, wherein the selecting is based at least in part upon monitoring symbol rate for the conventional channel and symbol rate for the robust channel.

24. The method of claim 22, wherein the selecting is based at least in part upon monitoring one or more of signal-to-noise ratio, carrier-to-noise ratio, average signal energy, and peak signal energy of a transmitted signal including the data of the conventional channel and the data of the robust channel.

25. The method of claim 22, wherein the selecting is based at least in part upon monitoring of extent packet corruption.

26. The method of claim 22, wherein the multiple buffer models are applicable to both the conventional channel and the robust channel.

27. The method of claim 22, wherein the data includes packets for a video stream.

28. The method of claim 22, wherein the identifying the buffer size includes selecting the buffer size from one of the multiple sets of reference decoder parameters.

29. The method of claim 22, wherein the identifying the buffer size includes interpolating between plural buffer size parameters of plural of the multiple sets of reference decoder parameters.

30. The method of claim 22, wherein the conventional channel is a first portion of a transmission channel and the robust channel is a second portion of the transmission channel.

31. The method of claim 30, wherein rate for the transmission channel exceeds rate for the conventional channel and exceeds rate for the robust channel.

32. The method of claim 22, further comprising:

based at least in part upon updated rate of the data for the selected channel, identifying in the receiver a new buffer size;

reconfiguring the buffer in the receiver according to the new buffer size.

33. The method of claim 22, wherein the relatively higher level of robustness of the data of the robust channel is in terms of increased redundancy through channel coding techniques for the data of the robust channel.

34. The method of claim 22, wherein the relatively higher level of robustness of the data of the robust channel is in terms of increased use of cyclical redundancy codes or convolutional codes within the data of the robust channel.

35. A computer-readable storage medium storing computer-executable instructions for causing the receiver programmed thereby to perform the method of claim 22.

* * * * *

UNITED STATES PATENT AND TRADEMARK OFFICE
CERTIFICATE OF CORRECTION

| | | |
|---|---|---|
| PATENT NO. | : 7,380,028 B2 | Page 1 of 1 |
| APPLICATION NO. | : 10/697502 | |
| DATED | : May 27, 2008 | |
| INVENTOR(S) | : Regis J. Crinon et al. | |

It is certified that error appears in the above-identified patent and that said Letters Patent is hereby corrected as shown below:

In column 12, line 65, in Claim 3, delete "steam" and insert -- stream --, therefor.

Signed and Sealed this
Twelfth Day of April, 2011

David J. Kappos
*Director of the United States Patent and Trademark Office*